US010654260B2

(12) United States Patent
Huang et al.

(10) Patent No.: US 10,654,260 B2
(45) Date of Patent: May 19, 2020

(54) STEREOLITHOGRAPHY APPARATUS

(71) Applicants: XYZPRINTING, INC., New Taipei (TW); KINPO ELECTRONICS, INC., New Taipei (TW)

(72) Inventors: Chen-Fu Huang, New Taipei (TW); An-Hsiu Lee, New Taipei (TW); Hao-Jen Huang, New Taipei (TW); Tsai-Yi Lin, New Taipei (TW)

(73) Assignees: XYZPRINTING, INC., New Taipei (TW); KINPO ELECTRONICS, INC., New Taipei (TW)

( * ) Notice: Subject to any disclaimer, the term of this patent is extended or adjusted under 35 U.S.C. 154(b) by 471 days.

(21) Appl. No.: 15/341,951

(22) Filed: Nov. 2, 2016

(65) Prior Publication Data
US 2018/0093429 A1 Apr. 5, 2018

(30) Foreign Application Priority Data

Sep. 30, 2016 (CN) .......................... 2016 1 0871358

(51) Int. Cl.
*B29C 67/00* (2017.01)
*B33Y 30/00* (2015.01)
*B29C 64/129* (2017.01)
*B29C 64/40* (2017.01)
*B29C 64/232* (2017.01)
*B29C 64/124* (2017.01)

(52) U.S. Cl.
CPC ............ *B33Y 30/00* (2014.12); *B29C 64/124* (2017.08); *B29C 64/129* (2017.08); *B29C 64/232* (2017.08); *B29C 64/40* (2017.08)

(58) Field of Classification Search
None
See application file for complete search history.

(56) References Cited

U.S. PATENT DOCUMENTS

| | | | |
|---|---|---|---|
| 2016/0361872 A1* | 12/2016 | El-Siblani | B29C 64/40 |
| 2017/0210080 A1* | 7/2017 | Ding | F16C 29/12 |
| 2017/0232680 A1* | 8/2017 | Skogsrud | B29C 64/20 425/140 |
| 2017/0369827 A1* | 12/2017 | Langenfeld | B01L 3/502761 |
| 2018/0141269 A1* | 5/2018 | Lee | B33Y 10/00 |

FOREIGN PATENT DOCUMENTS

JP 2017132254 A * 8/2017 ........... B29C 64/245

* cited by examiner

*Primary Examiner* — Ryan M Ochylski
(74) *Attorney, Agent, or Firm* — Chun-Ming Shih; HDLS IPR Services (57) ABSTRACT

A stereo lithography apparatus includes a base, a lifting rail, a slider, a forming pedestal, a nut assembly and a screw rod. The lifting rail is arranged upright on the base. The slider is arranged on the lifting rail and allowed to move along the lifting rail. A position hole and at least an adjusting groove are defined on the forming pedestal. The nut assembly is connected with the slider by multiple screw bolts, one of the screw bolts is inserted through the position hole and connected with the slider, each of the other screw bolts is inserted through corresponding adjusting groove and connected with the slider. The screw rod is arranged upright on the base and engaged with the nut assembly. Thereby, the nut assembly would not be rotated to stick the screw rod while the forming pedestal is rotated.

11 Claims, 7 Drawing Sheets

STEREOLITHOGRAPHY APPARATUS

BACKGROUND OF THE INVENTION

Technical Field

The present disclosure is related to a stereo lithography apparatus, particularly a stereo lithography apparatus having a horizontal adjustable forming pedestal.

Description of Related Art

A conventional stereo lithography apparatus includes a tank and a forming pedestal disposed corresponding to the tank, and a molding solution is contained in the tank. The forming pedestal is usually arranged in the tank and is submerged in the molding solution and contacts a liquid surface, and an upper light source illuminates downward the molding solution on the forming pedestal so that the molding solution on the forming pedestal is thereby solidified to form a part of a product on the forming pedestal. Then, the forming pedestal is moved downward to move the solidified part of the product into the molding solution. The upper light source further illuminates the molding solution on the solidified part of the product to solidify and stack another part of the product thereon. The step is repeated until whole product is accomplished.

The present disclosure is related to another common arrangement of forming pedestal which is hung above the tank and arranged downward to contact the liquid surface, a lower light source illuminates upward through the tank to the molding solution on the forming pedestal and the molding solution on the forming pedestal is thereby solidified on the forming pedestal to form a part of the product. Then, the forming pedestal is moved upward to move the solidified part of the product away the molding solution. The lower light source further illuminates to the molding solution on the solidified part of the product to solidify and stacks another part of product thereon. The step is repeated until whole product is accomplished. The forming pedestal is able to be up-down moved accompany with a slider arranged on a rail, the forming pedestal includes a nut, the nut is engaged with a screw rod arranged upright, and the forming pedestal could be moved along the rail while the screw rod is rotated. Generally, the forming pedestal is connected with the slider by screw bolts, through holes slightly larger than outer diameters of the screw bolts are defined on the forming pedestal, and the forming pedestal is thereby rotatable and horizontal adjustable. However, the nut is rotated corresponding to the screw rod and the screw rod is therefore stuck while the forming pedestal is rotated.

In views of this, in order to solve the above disadvantage, the present inventor studied related technology and provided a reasonable and effective solution in the present disclosure.

SUMMARY

A stereo lithography apparatus having a horizontal adjustable forming pedestal is provided in the present disclosure.

A stereo lithography apparatus, including a base, a lifting rail, a slider, a forming pedestal, a nut assembly and a screw rod is provided in the present disclosure. The lifting rail is arranged upright on the base. The slider is arranged on the lifting rail and allowed to move along the lifting rail. A position hole and at least an adjusting groove are defined on the forming pedestal. The nut assembly is connected with the slider by multiple screw bolts, one of the screw bolts is inserted through the position hole and connected with the slider, each of the other screw bolts is inserted through corresponding adjusting groove and connected with the slider. The screw rod is arranged upright on the base and is engaged with the nut assembly.

The stereo lithography apparatus of the present disclosure further includes a solution tank arranged on the base, and the forming pedestal is hung above the solution tank. The forming pedestal includes a frame and a platform arranged on the frame. The position hole and the adjusting groove are arranged on the frame. The nut assembly includes a nut, the screw rod is engaged with the nut. The nut assembly includes a connecting board, the nut is arranged on the connecting board, and the frame is clamped between the connecting board and the slider. A plurality of screw holes are defined on the connecting board, one of the screw holes is aligned with the position hole, each of the other screw holes is aligned with corresponding adjusting groove, one of the screw bolts is inserted through corresponding screw hole and further inserted through corresponding position hole to connect with the slider, each of the other screw bolts is inserted through corresponding screw hole and further inserted through corresponding adjusting groove to connect with the slider.

The stereo lithography apparatus of the present disclosure, wherein each adjusting groove is an arc groove. An arc center of the adjusting groove is located in the position hole. A motor is connected with the screw rod, and the screw rod is driven by the motor to rotate about an axial direction of the screw rod.

The stereo lithography apparatus of the present disclosure, wherein a plurality of screw holes are defined on the nut assembly, one of the screw holes is aligned with the position hole, each of the other screw holes is aligned with corresponding adjusting groove, one of the screw bolts is inserted through corresponding screw hole and further inserted through corresponding position hole to be screwed with the slider, each of the other screw bolts is inserted through corresponding screw hole and further inserted through corresponding adjusting groove to be screwed with the slider.

The forming pedestal and the nut assembly are independent elements, the nut assembly thereby would not be rotated accompany with the forming pedestal while the forming pedestal is rotated, the nut assembly therefore would not be rotated to lock the screw rod.

BRIEF DESCRIPTION OF DRAWING

The present disclosure can be more fully understood by reading the following detailed description of the embodiment, with reference made to the accompanying drawings as follows.

DETAILED DESCRIPTION

Please refer to FIGS. 1 to 4, a stereo lithography apparatus including a base 100, a lifting rail 200, a slider 300, a forming pedestal 400, a nut assembly 500, a screw rod 600 and a solution tank 700 is provided in an embodiment of the present disclosure.

In the present embodiment, the base 100 is preferably of a plate shape, but types of the base 100 of the present disclosure is not limited by the embodiment.

In the present embodiment, the lifting rail 200 is of a rod shape and made of metal, the lifting rail 200 is arranged upright on the base 100 and a sliding groove 201 is defined on each of a couple of side walls of the lifting rail 200 opposite each other, and each of the sliding groove 201 is extended form an end of the lifting rail 200 to the other end of the lifting rail 200.

The slider 300 is arranged on the lifting rail 200, at least a part of the slider 300 is preferably embedded in the sliding groove 201, and the slider 300 is up-down movable along the lifting rail 200.

Figure 4:
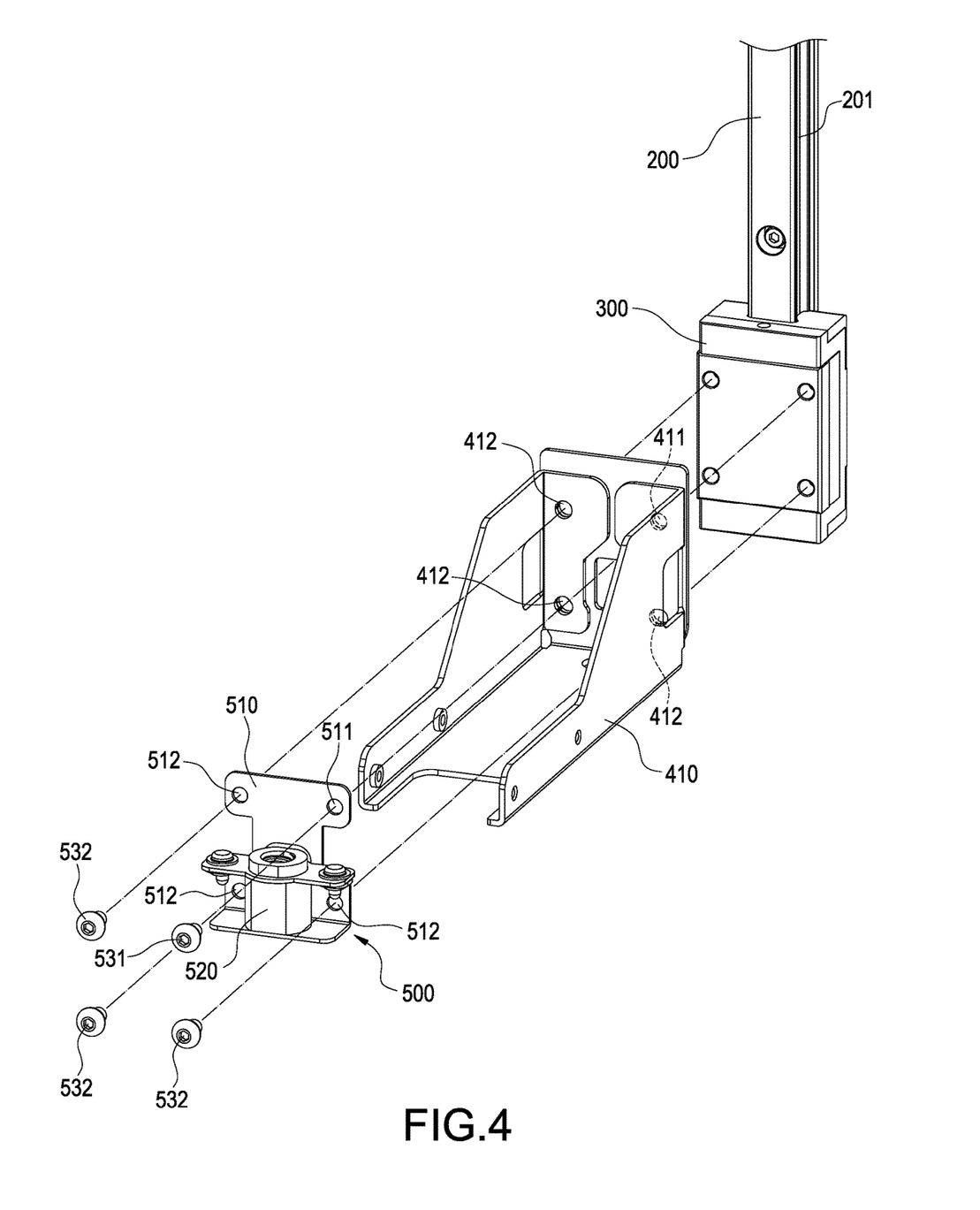
FIG. 4 is a partial exploded view showing the stereo lithography apparatus in the embodiment of the present disclosure.
Figure 5:
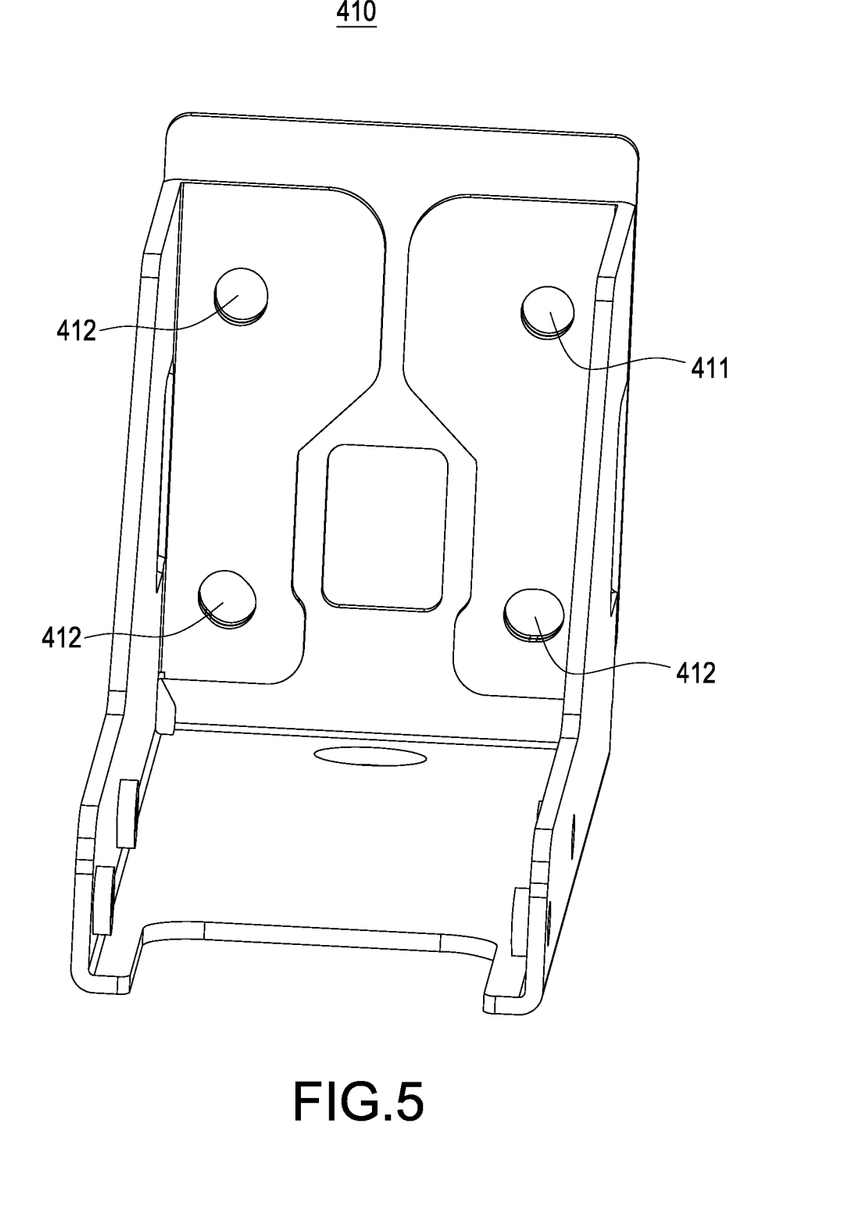
FIG. 5 is a perspective view showing a frame of the stereo lithography apparatus in the embodiment of the present disclosure.
Figure 6:
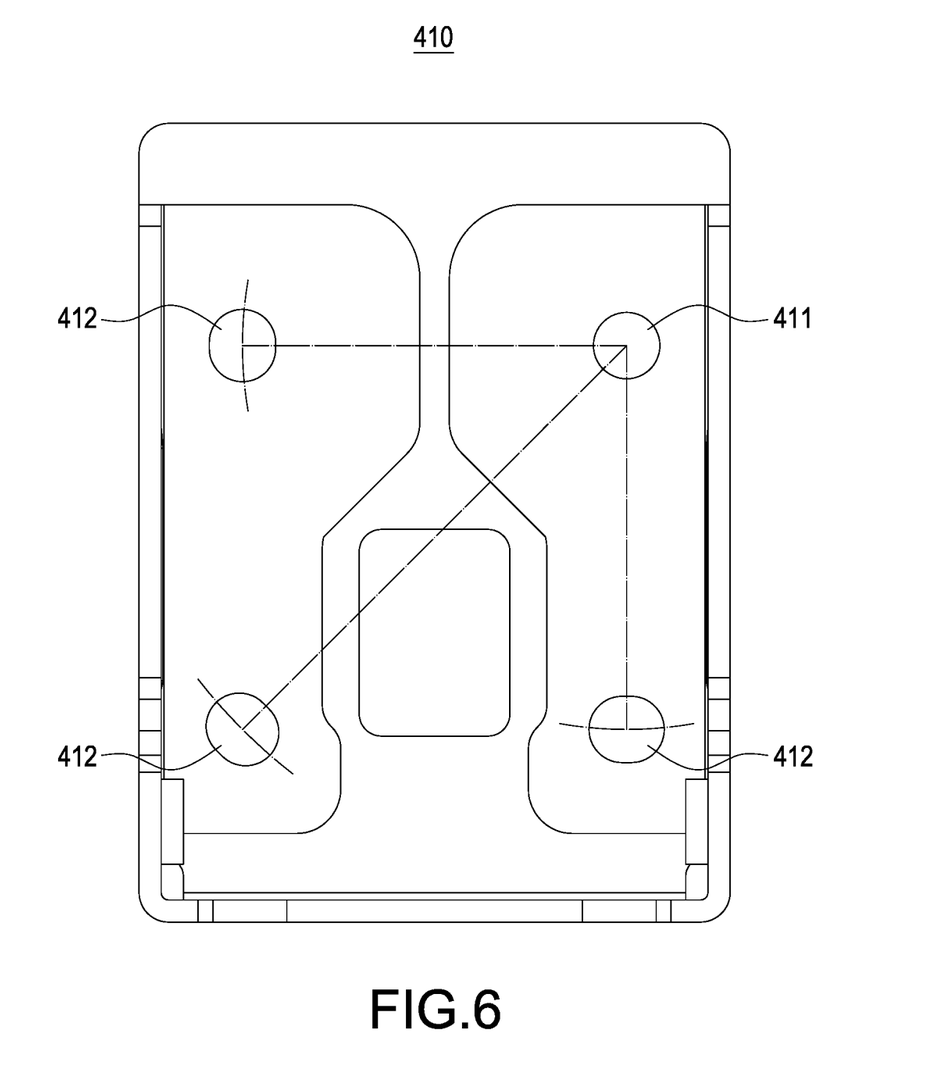
FIG. 6 is a front view the showing the frame of the stereo lithography apparatus in the embodiment of the present disclosure.
Figure 7:
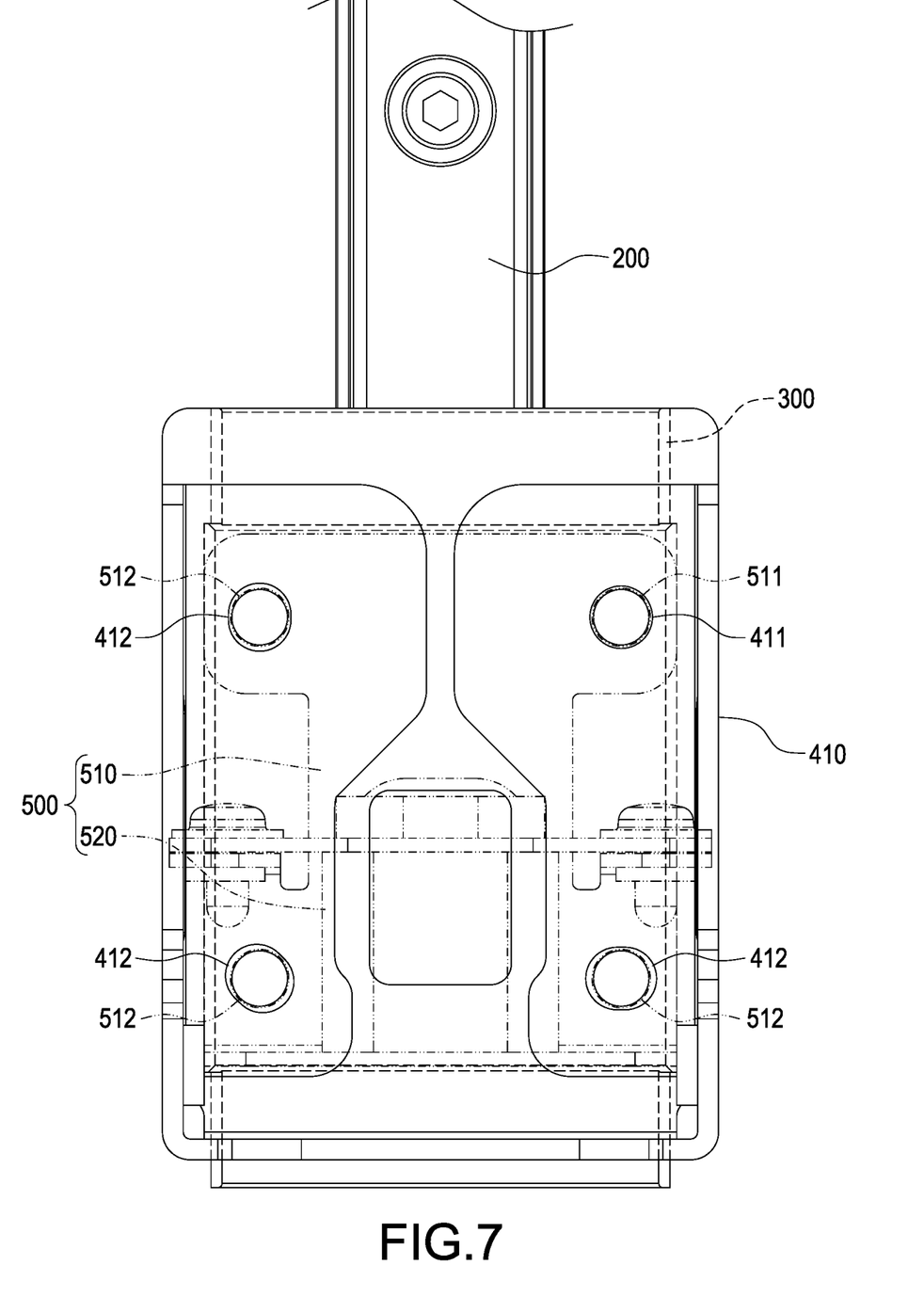
FIG. 7 is a perspective view showing an arrangement of the frame and a nut assembly the of the stereo lithography apparatus in the embodiment of the present disclosure.

Please refer to FIGS. 4 to 6, in the present embodiment, the forming pedestal 400 includes a frame 410 and a platform 420 arranged on the frame 410. A position hole 411 and at least an adjusting groove 412 are defined on the frame 410, in the present embodiment, three adjusting grooves 412 having the same structure and function are preferably defined on the frame 410, but quantity of the adjusting grooves 412 of the present disclosure is not limited by the embodiment. Each of the adjusting grooves 412 is preferably an arc groove, and an arc center of each adjusting groove 412 coincides with a center of the position hole 411.

Please refer to FIGS. 1 to 4, the nut assembly 500 is connected with the slider 300, and the aforementioned forming pedestal 400 is clamped between the nut assembly 500 and the slider 300 and thereby arranged on the lifting rail 200. The nut assembly 500 includes a connecting board 510, a nut 520 and a plurality of screw bolts 531/532, the nut 520 is arranged on the connecting board 510, and the frame 410 of the forming pedestal 400 is clamped between the connecting board 510 and the slider 300. A plurality of screw holes 511/512 are defined on the connecting board 510, one of the screw holes 511 is aligned with the position hole 411, each of the other screw holes 512 is aligned with corresponding adjusting groove 412. The screw bolt 531 is inserted through the nut assembly 500 and further inserted through the position hole 411 to connect the slider 300; each of the other screw bolts 532 is inserted through the nut assembly 500 and further inserted through corresponding adjusting groove 412 to connect the slider 300. In the present embodiment, one of the screw bolts 531 is preferably inserted through corresponding screw hole 511 on the connecting board 510 and further inserted through corresponding position hole 411 to be screwed with the slider 300; each of the other screw bolts 532 is inserted through corresponding screw hole 512 on the connecting board 510 and further inserted through corresponding adjusting groove 412 to be screwed with the slider 300.

Figure 1:
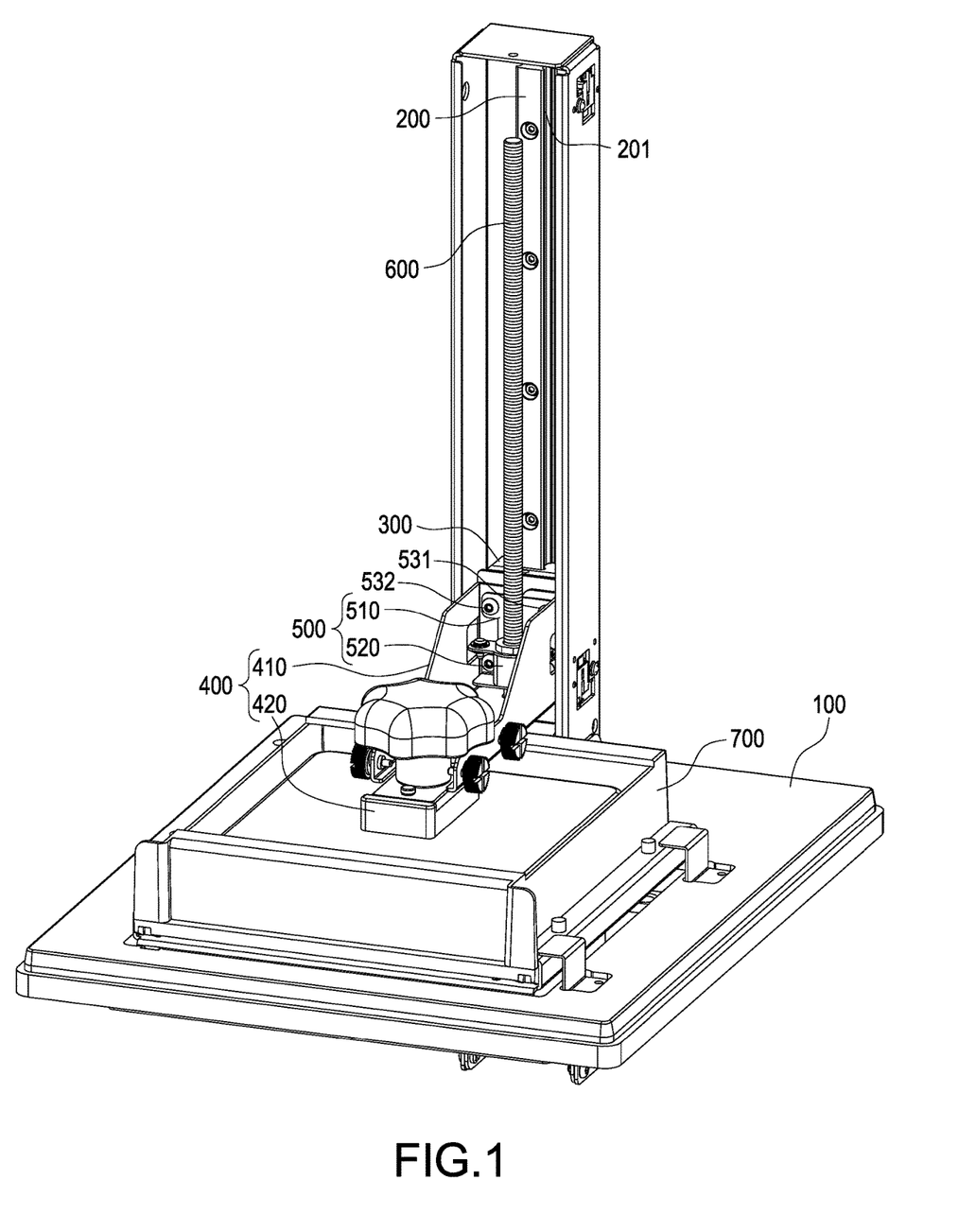
FIG. 1 is a perspective view showing a stereo lithography apparatus in an embodiment of the present disclosure.
Figure 2:
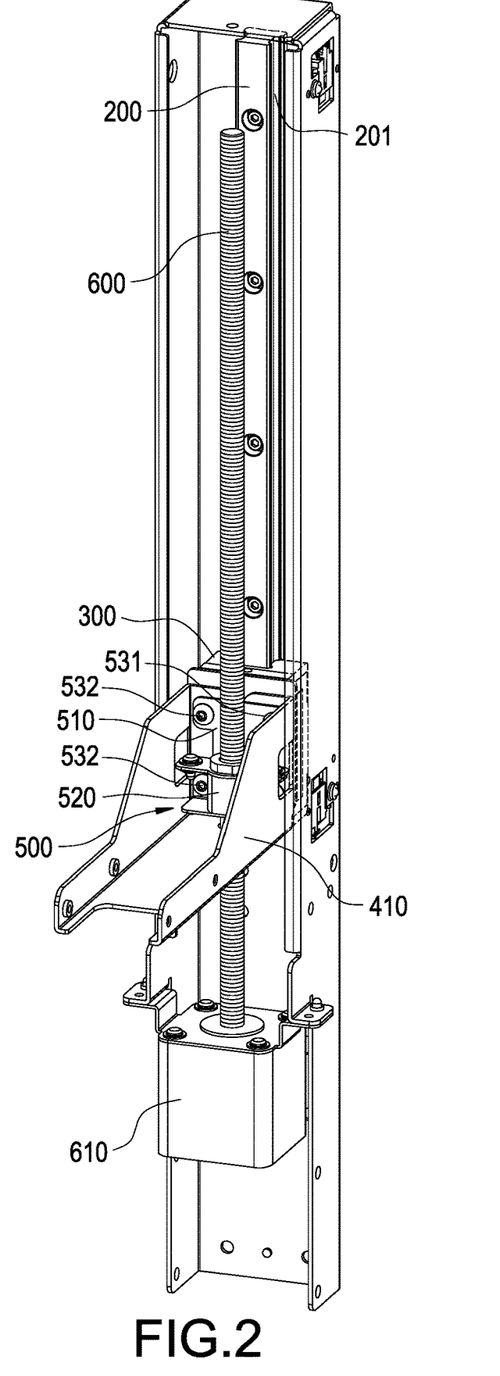
FIG. 2 is a partial perspective view showing the stereo lithography apparatus in the embodiment of the present disclosure.
Figure 3:
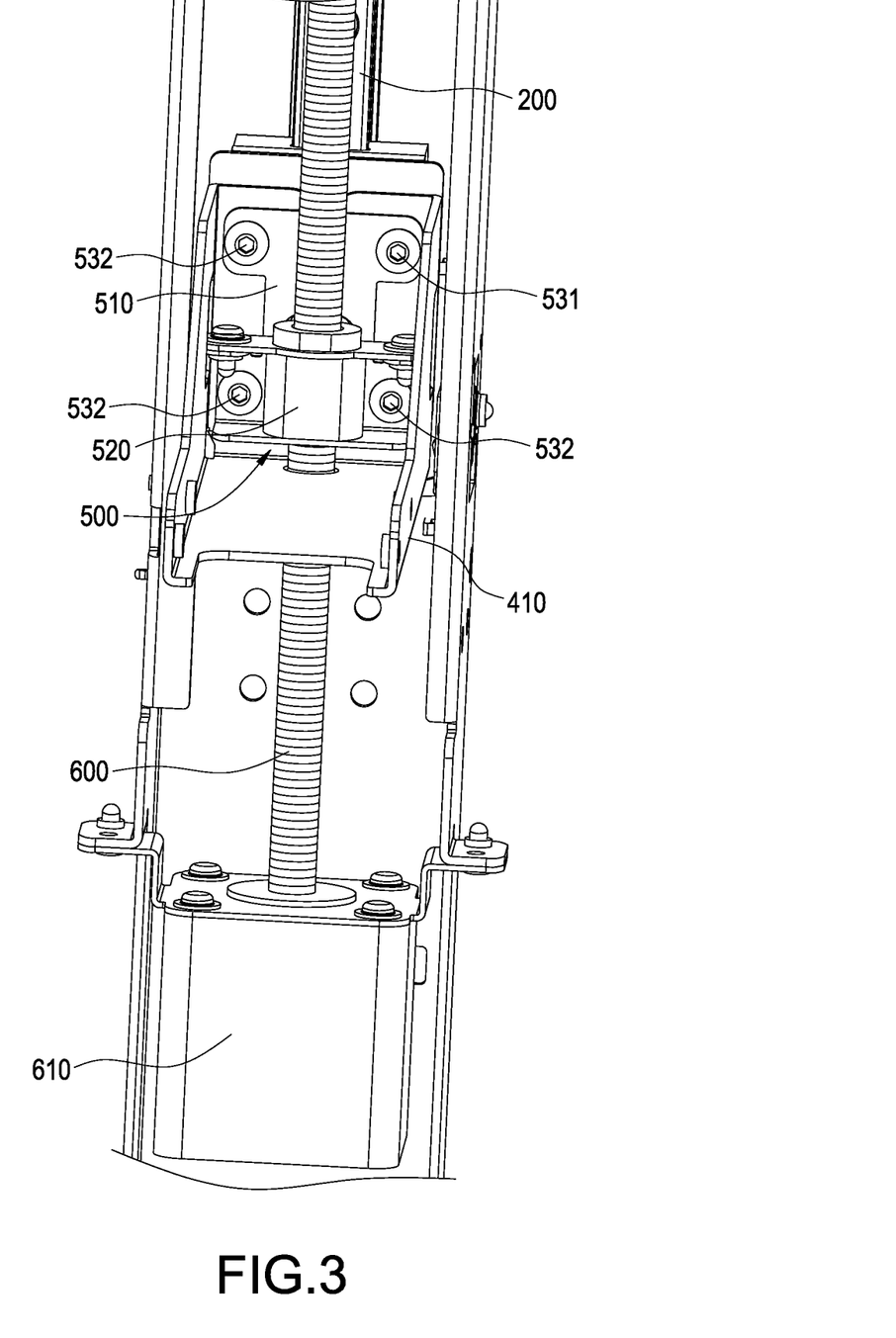
FIG. 3 is another partial perspective view showing the stereo lithography apparatus in the embodiment of the present disclosure.

Please refer to FIGS. 1 to 3, the screw rod 600 is arranged upright on the base 100 and engaged with the nut 520 of the nut assembly 500. A motor 610 is connected with the screw rod 600, and the motor 610 is fixed on the base 100 and used for driving the screw rod 600 to rotate about an axial direction of the screw rod 600.

Please refer to FIG. 1, the solution tank 700 is arranged on the base 100, the forming pedestal 400 is hung above the solution tank 700, the forming pedestal 400 could be up-down moved related to the solution tank 700.

Please refer to FIGS. 4 to 7, the stereo lithography apparatus of the present disclosure, wherein a position hole 411 and adjusting grooves 412 corresponding to the position holes 411 are defined on the forming pedestal 400, the screw bolt 532 in each of the adjusting groove 412 is allowed to move therein. The arc center of each adjusting groove 412 coincides the center of the position hole 411, the frame 410 of the forming pedestal 400 is therefore allowed to be rotate about the position hole 411, a rotating range is limited by length of the shortest adjusting groove 412, and the platform 420 of the forming pedestal 400 is horizontal adjustable by adjusting an inclination angle of the forming pedestal 400. The forming pedestal 400 and nut assembly 500 are independent elements, and the nut assembly 500 would not be rotated accompany with the forming pedestal 400 while the forming pedestal 400 is rotated, the nut 520 therefore would not be rotated to stick the screw rod 600.

Although the present disclosure has been described with reference to the foregoing preferred embodiment, it will be understood that the disclosure is not limited to the details thereof. Various equivalent variations and modifications can still occur to those skilled in this art in view of the teachings of the present disclosure. Thus, all such variations and equivalent modifications are also embraced within the scope of the present disclosure as defined in the appended claims.

What is claimed is:

1. A stereo lithography apparatus, comprising:
   a base;
   a lifting rail arranged upright on the base;
   a slider arranged on the lifting rail and being movable along the lifting rail;
   a forming, a position hole and at least an adjusting groove being defined on the forming pedestal;
   a nut assembly connected with the slider by a plurality of screw bolts, one of the screw bolts being inserted through the position hole and connected with the slider, each of the other screw bolts being inserted through corresponding adjusting groove and connected with the slider; and
   a screw rod arranged upright on the base and engaged with the nut assembly.

2. The stereo lithography apparatus according to claim 1, further comprising a solution tank arranged on the base, and the forming pedestal is hung above the solution tank.

3. The stereo lithography apparatus according to claim 1, wherein the forming pedestal comprises a frame and a platform arranged on the frame.

4. The stereo lithography apparatus according to claim 3, wherein the position hole and the adjusting groove are arranged on the frame.

5. The stereo lithography apparatus according to claim 4, wherein the nut assembly includes a nut, the screw rod is engaged with the nut.

6. The stereo lithography apparatus according to claim 5, wherein the nut assembly includes a connecting board, the nut is arranged on the connecting board, the frame is clamped between the connecting board and the slider.

7. The stereo lithography apparatus according to claim 6, wherein a plurality of screw holes are defined on the connecting board, one of the screw holes is aligned with the position hole, each of the other screw holes is aligned with corresponding adjusting groove, one of the screw bolts is inserted through corresponding screw hole and is further inserted through corresponding position hole to connect with the slider, each of the other screw bolts is inserted through corresponding screw hole and is further inserted through corresponding adjusting groove to connect with the slider.

8. The stereo lithography apparatus according to claim 1, wherein the adjusting groove is an arc groove.

9. The stereo lithography apparatus according to claim 8, wherein an arc center of the adjusting groove is located in the position hole.

10. The stereo lithography apparatus according to claim 1, wherein a motor is connected with the screw rod, the screw rod is driven by the motor to rotate about an axial direction of the screw rod.

11. The stereo lithography apparatus according to claim 1, wherein a plurality of screw holes are defined on the nut assembly, one of the screw holes is arranged alight with the position hole, each of the other screw holes is arranged alight with corresponding adjusting groove, one of the screw bolts is inserted through corresponding screw hole and is further inserted through corresponding position hole to connect with the slider, each of the other screw bolts are inserted through corresponding each of the screw hole and is further inserted through corresponding adjusting groove to connect with the slider.

* * * * *